US012503535B2

(12) United States Patent
Saija et al.

(10) Patent No.: US 12,503,535 B2
(45) Date of Patent: Dec. 23, 2025

(54) STABLE AQUEOUS POLYMER DISPERSIONS

(71) Applicant: Arkema France, Colombes (FR)

(72) Inventors: Leo Mario Saija, Bagnolo in Piano (IT); Mario Lugli, Fabbrico (IT); Flippo Finetti, Parma (IT); Umberto Amadei, Commessaggio (IT)

(73) Assignee: Arkema France, Puteaux (FR)

( * ) Notice: Subject to any disclaimer, the term of this patent is extended or adjusted under 35 U.S.C. 154(b) by 48 days.

(21) Appl. No.: 16/633,258

(22) PCT Filed: Jul. 5, 2018

(86) PCT No.: PCT/EP2018/068294
§ 371 (c)(1),
(2) Date: Jan. 23, 2020

(87) PCT Pub. No.: WO2019/020342
PCT Pub. Date: Jan. 31, 2019

(65) Prior Publication Data
US 2021/0130517 A1 May 6, 2021

(30) Foreign Application Priority Data

Jul. 25, 2017 (EP) ..................... 17183080

(51) Int. Cl.
*C08F 212/08* (2006.01)
*D04H 1/587* (2012.01)
*D04H 1/64* (2012.01)
*D06M 15/233* (2006.01)
*D06M 15/263* (2006.01)

(52) U.S. Cl.
CPC ........... *C08F 212/08* (2013.01); *D04H 1/587* (2013.01); *D04H 1/64* (2013.01); *D06M 15/233* (2013.01); *D06M 15/263* (2013.01); *C08F 2810/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,151,149 A * | 4/1979 | Smith | ................... | C09D 127/08 524/817 |
| 5,405,693 A | 4/1995 | Dittrich et al. | | |
| 5,430,092 A | 7/1995 | Aydin et al. | | |
| 5,869,589 A * | 2/1999 | Raynolds | ................... | C08F 8/14 526/320 |
| 5,910,532 A * | 6/1999 | Schmidt | ................... | A61Q 17/00 524/832 |
| 6,133,345 A | 10/2000 | Pakusch et al. | | |
| 6,201,048 B1 | 3/2001 | Raynolds et al. | | |
| 6,417,267 B1 | 7/2002 | Stockl et al. | | |
| 6,426,121 B1 * | 7/2002 | Goldstein | .......... | C09D 151/003 427/389.8 |
| 2002/0052451 A1 * | 5/2002 | Vandevoorde | ..... | C08G 18/6266 525/533 |
| 2004/0209992 A1 * | 10/2004 | Becchi | ...................... | C08F 2/22 524/556 |
| 2009/0230345 A1 * | 9/2009 | Saija | ..................... | C08F 291/00 252/8.57 |
| 2010/0240824 A1 | 9/2010 | Alpert et al. | | |
| 2010/0255321 A1 * | 10/2010 | Jahns | ...................... | C08F 2/24 428/451 |
| 2011/0207851 A1 * | 8/2011 | Lohmeijer | ........ | C08F 220/1804 427/386 |
| 2017/0002106 A1 * | 1/2017 | Markou | ................... | C08K 5/17 |
| 2017/0030015 A1 | 2/2017 | Amin et al. | | |
| 2017/0189311 A1 * | 7/2017 | Macneill | ................... | A61K 8/88 |
| 2018/0312699 A1 * | 11/2018 | Akiyama | ............... | C08F 220/14 |

FOREIGN PATENT DOCUMENTS

| | | | | |
|---|---|---|---|---|
| AU | 2449184 A1 | 10/1984 | | |
| CN | 1410498 A | 4/2003 | | |
| CN | 102203193 A * | 9/2011 | ............ | C08F 220/18 |
| EP | 0 357 149 A2 | 3/1990 | | |
| EP | 0814096 A1 | 1/1998 | | |
| EP | 1 245 240 A1 | 10/2002 | | |
| EP | 1342762 A2 | 9/2003 | | |
| EP | 1598373 A1 | 11/2005 | | |
| EP | 2 692 752 A1 | 2/2014 | | |
| EP | 2 692 753 A1 | 2/2014 | | |
| GB | 1521716 | 8/1978 | | |
| GB | 2369122 A * | 5/2002 | .......... | C08F 290/067 |
| JP | 62104802 A * | 5/1987 | | |
| JP | 2017075211 A * | 4/2017 | | |
| WO | WO9102759 | 3/1991 | | |
| WO | WO11051373 A1 | 5/2011 | | |
| WO | WO-2012131050 A1 * | 10/2012 | ............ | C08F 242/00 |
| WO | WO 2014/139074 A1 | 9/2014 | | |

OTHER PUBLICATIONS

Machine translation of JP 62104802 A, retrieved Jan. 2022. (Year: 2022).*

(Continued)

*Primary Examiner* — Katarzyna I Kolb
(74) *Attorney, Agent, or Firm* — Debodhonyaa Sengupta

(57) ABSTRACT

The invention relates to aqueous polymer dispersions stable for at least 12 h, when dissolved in high amount of organic solvents and acidified at low pH (pH<2). The polymer comprises units and/or groups issued from: a) at least one (meth)acrylic monomer which is (meth)acrylic ester of a C1-C12 alcohol without any other functional group than (meth)acrylate, b) at least monomer b1) or initiator b2) or both as defined: b1) at least one vinylic, allylic or (meth) acrylic monomer, bearing an anionic group derived from strong acids with pKa<3, b2) at least one initiator, bearing the same anionic group as b1), c) at least one hydroxy-functional vinylic, allylic or (meth)acrylic monomer, and optional monomers, and which polymer bears: the anionic groups as defined in b) in an amount of at least 0.05 meq/g and hydroxy groups as defined in c) in an amount of at least 0.1 meq/g.

21 Claims, 1 Drawing Sheet

(56) References Cited

OTHER PUBLICATIONS

Meng, Ambient Self-crosslinkable Acrylic Microemulsion in the Presence of Reactive Surfactants, Iranian Polymer Journal 17 (7), 2008, 555-564 (Year: 2008).*
Opposition to Patent EP3 658 594 B1 = Application 18/734,600.2 Patentee Arkema France. "Stable Wassrige Polymer Dispersions"—Opponent BASF SE (Mark RecID 89113686/RUS)—European Patent Office 80298 Munich.

* cited by examiner

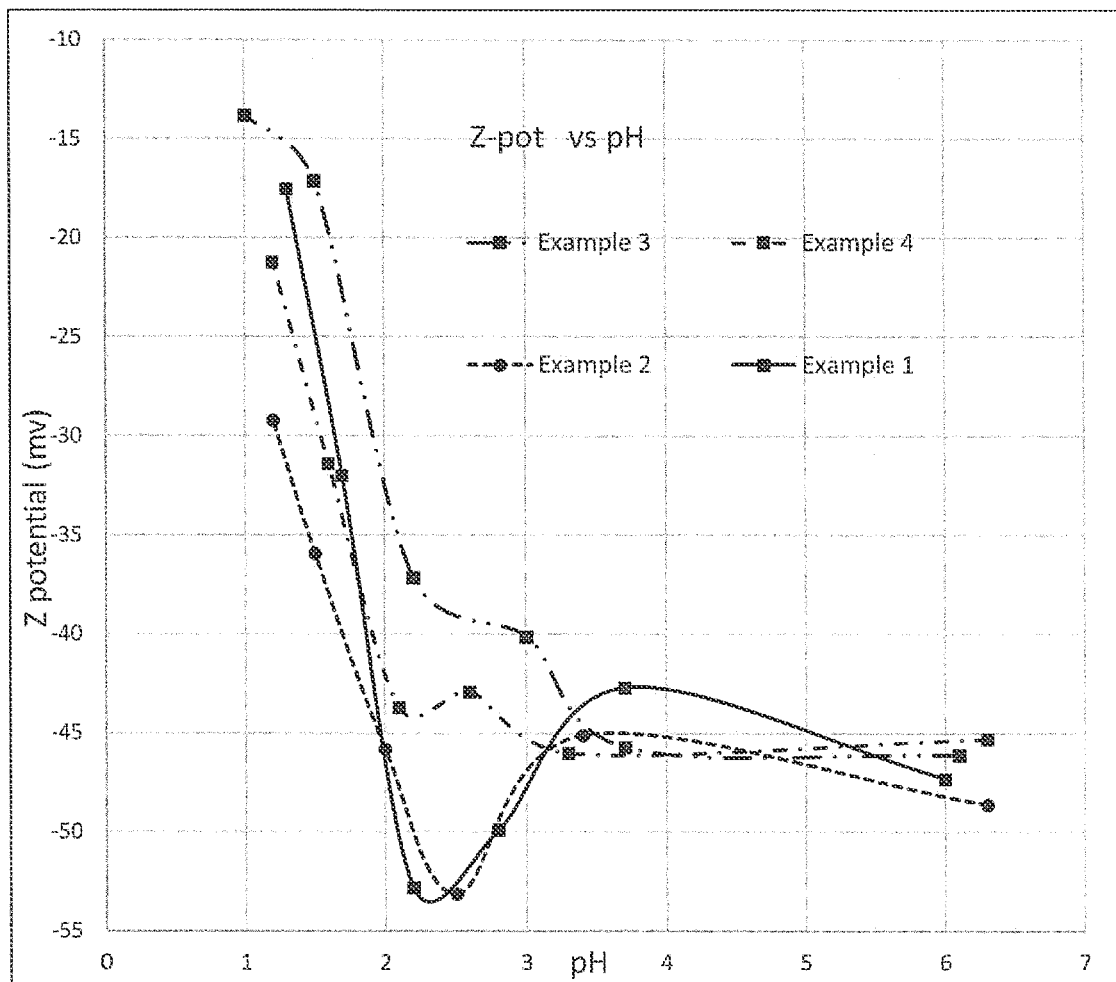
Z potentials at different pH of the polymer dispersions of the examples

STABLE AQUEOUS POLYMER DISPERSIONS

CROSS-REFERENCE TO RELATED APPLICATIONS

This application is a national stage application under 35 U.S.C. § 371 of PCT/EP2018/068294, filed Jul. 5, 2018 which claims benefit to application EP 17183080.5, filed Jul. 25, 2017.

The present invention relates to a specific polymeric aqueous dispersion, which is stable for long laps of time, when dissolved in high amount of organic solvents and eventually acidified at very low pH.

The aqueous dispersion of the present invention is an anionic polymer dispersion, produced by emulsion polymerization of a specific mixture of monomers selected from acrylic (meaning acrylic or methacrylic), allylic and vinylic monomers (the last family including vinyl esters, vinyl aromatic and maleate monomers). The main characteristic of this aqueous polymer dispersion is that its polymer particles contain high amount of strong acid functionalities.

It is known that when a waterborne polymer interacts with high amount of organic solvents, especially if they (said solvents) are water-soluble, they can increase the solubility of the surfactants in the liquid phase, in this way depleting the amount of surfactant bound on the particles surface, destabilizing them, with as a result the coagulations of the polymer dispersion. This is especially true when by adding acid substances to the aqueous polymer dispersion, the pH is decreased to low values (under 2.0) and the medium ionic force is increased compressing the ionic repulsive double layer. This leads to a strong decrease of the repulsion forces, thus decreasing the distance between particles, until a coagulation process starts.

U.S. Pat. No. 5,910,532 discloses a composition for removable coatings, with water and other organic solvents composing the dispersion media, the preferred solvent being propanol. However, for achieving stability, it is essential to have a functional monomer bearing a cationic group. It also discloses the use of acid groups but not necessarily strong acids and the organic solvent in the examples is added in the polymerization media in an amount not higher than the amount of waterborne polymer dispersion.

EP 0357149 discloses the preparation of a pesticide formulation, where the pesticide is dissolved in an organic solvent and it is mixed with an aqueous waterborne copolymer produced by grafting a copolymer with a copolymerisable reactive surfactant. The behaviour of this grafted polymeric surfactant is independent by the pH, produced by polymerization.

However, this disclosure is restricted only to a composition with pesticide dissolved in solvents and by only using grafted surfactants to the copolymer, moreover from the examples it can be deducted that water is always the main solvent of these compositions.

Other waterborne polymer dispersions containing strong acid groups are also known from prior art. WO 2014139074 discloses the use of a water-soluble polymer containing sulfonic groups, as a co binder in a composition useful to produce stain resistant paints. Also, EP 2692753 and EP 2692752 disclose the use of monomer containing sulfonic groups, to be used for producing water-soluble polymeric dispersing agents with high dispersing efficiency on pigment particles. In EP 1245240 are disclosed strong acid monomers which are used for producing water-soluble hydrogel polymer adhesives for medical use.

None of the cited prior art discloses or suggests a way to modify an acrylic aqueous polymer dispersion by the use of only strong acid groups bound on the polymer particles in order to give them stability in the presence of high amount of organic solvents, water soluble or not, in strong acidic conditions (pH<2.0). Surprisingly, the aqueous polymer dispersion according to the present invention is stable in the presence of high amount of organic solvents, without the need of any polymerised surfactants grafted on the particles or cationic groups and without being restricted to a specific use such as for producing pesticide dispersions. Moreover, this invention enables achieving these results by using monomers containing strong acid groups directly copolymerized with the other monomers and/or by introducing the required amount of said acid groups by the alternative route of using the correct type and amount of specific initiators introducing such acid groups.

The first subject matter of the present invention relates to an aqueous polymer dispersion with said polymer obtained by emulsion polymerisation of a specific monomeric and initiator composition.

A second subject of the invention relates to a binder composition comprising at least one aqueous polymer dispersion as defined according to the present invention.

Another subject matter relates to the use of said binder composition for application on specific substrates.

Finally, the invention also covers the use of said aqueous polymer dispersion in two components crosslinkable binder compositions such as by using as crosslinking agent: aminoplast resins, phenolic, urea-formaldehyde, melamine-formaldehyde resins or polyisocyanates or polyaziridines or polycarbodiimides, in particular the most preferred being phenolic resins.

The objective of the present invention is an aqueous polymer dispersion, which enables stability for at least 12 hours, when dissolved in high amount of organic solvents and eventually when acidified at low pH (pH<2).

This objective is achieved with an aqueous polymer dispersion which comprises units (structural units) and/or groups (functional groups) issued from:
a) at least one (meth)acrylic monomer which is a (meth) acrylic ester of a $C_1$-$C_{12}$ alcohol which alcohol is linear ($C_1$-$C_{12}$) or branched ($C_4$-$C_{12}$), without any other functional group than (meth)acrylate
b) at least one from monomer b1) or initiator b2) or both b1) and b2) as defined below:
  b1) at least one vinylic, allylic or (meth)acrylic monomer, preferably vinylic or (meth)acrylic monomer, bearing an anionic group derived from strong acids with pKa<3, preferably <2
  b2) at least one initiator, bearing the same anionic group as b1)
c) at least one hydroxy-functional vinylic, allylic or (meth) acrylic monomer, preferably vinylic or (meth)acrylic monomer
d) optionally, at least one carboxy-functional ethylenically unsaturated monomer
e) optionally, at least one vinylic monomer, without any other functional group than vinylic group, bearing only one vinyl group
f) optionally, at least one vinylic or (meth)acrylic monomer bearing at least one functional group selected from: nitrile, amide, acetoacetoxy, diacetone, free silane or alkoxy-blocked silane, epoxy, urea or ureïdo
g) optionally, at least one multifunctional vinylic or (meth) acrylic monomer, and in that said polymer bears:
the anionic groups as defined in b) in an amount of at least 0.05 meq/g, preferably from 0.07 to 0.3 meq/g (as calculated, see below) with respect to said polymer and hydroxy groups as defined in c) in an amount of at least 0.1 meq/g, preferably from 0.1 to 0.8 meq/g (as calculated, see below) with respect to said polymer.

The calculation of the amount of anionic or hydroxyl groups is based on the molar amount of said monomer b1) and/or of said initiator b2) and of monomer c) (vs hydroxy) used for preparing the polymer with respect to the total theoretical weight of said polymer, supposing absence of free monomer b1) or c) and absence of free initiator b2) after the polymerization and that all monomers used are converted to the polymer (100% conversion).

The said at least one vinylic monomer e), "without any other functional group than vinyl group, bearing only one vinyl group" is to be interpreted as meaning in the present invention as "a monovinylic monomer without any functional group as borne by monomers b1) c), d) and f) as defined above, which in particular may bear one aromatic group linked to the vinylic group or one or two ester groups linked to said vinylic group and more particularly said monomer e) is a vinyl aromatic monomer, preferably styrene or vinyl toluene or is a vinyl alcohol ester, preferably vinyl acetate or vinyl versatate or a maleate or fumarate mono alkyl ester or dialkyl diester. Said alkyl in fumarate of maleate monoesters or diesters is an alkyl selected from $C_1$ to $C_8$, preferably $C_2$ to $C_6$.

More preferably, said vinylic monomers e) are selected from: vinyl acetate, vinyl versatate and di- or mono-alkyl maleates or di- or mono-alkyl fumarates or styrene.

According to a specific option of the invention, said monomer d) is present in said polymer at a weight content with respect to said polymer of 0.05% to 6%.

Said anionic groups as defined in b) is preferably a sulphur-containing acid group and salts or a phosphorous-containing acid group and salts.

In particular, said anionic groups as defined in b) are selected from the group consisting of:
a sulfonic acid group ($-SO_3H$) (I, see below) or a half-ester group of sulphuric acid (II) and their corresponding salts or a phosphonic acid group (III) or a partial ester group of phosphoric acid (IV or V) and their corresponding salts as presented in the following formulas (I) to (V) below with said groups beared by the polymeric residue represented by R:

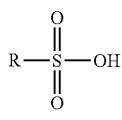

(I)

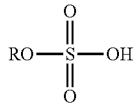

(II)

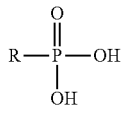

(III)

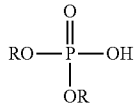

(IV)

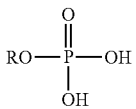

(V)

More particularly, said anionic groups as defined in b) can be issued from:
b1) monomers selected from the group consisting of the following acids and their salts, preferably salts of sodium, ammonium or other cations, of:
2 acrylamido 2 methyl propane sulfonic acid (VI, as shown below), styrene sulfonic acid (VII), 1-allyloxy-2-hydroxypropane sulfonic acids (VIII), vinyl sulfonic acid (IX), 3 sulfo propyl acrylate acid (X)
monomeric partial esters of phosphoric acid and derivatives, like bis(methacryloyloxyethyl) hydrogen phosphate (XI) or 2-(phosphonooxy)ethyl methacrylate (XII), vinyl phosphonic acid (XIII),

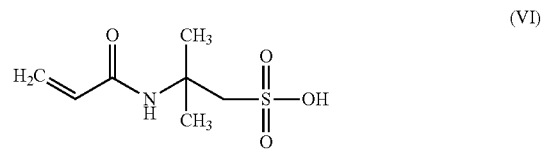

(VI)

(VII)

(VIII)

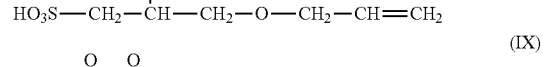

(IX)

(X)

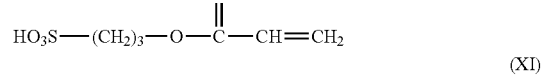

(XI)

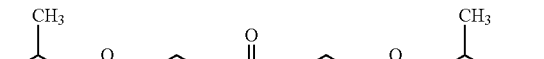

(XII)

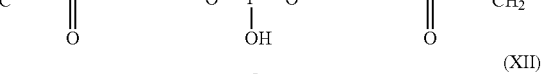

(XIII)

b2) initiators selected from the group consisting of: sodium persulphate, ammonium persulphate and potassium persulphate.

The polymer of the aqueous polymer dispersion according to the invention may further contain h) at least one anionic polymerizable surfactant and/or at least one non-ionic polymerizable surfactant in an amount from 0.1 to 5%, preferably from 0.1 to 2% by weight with respect to the total of monomers, more preferably said polymerizable surfactant being selected as follows:

for anionic polymerizable surfactants from: Polyoxyethylene 9-octadecenyl ether phosphate (XIV, Maxemul® 6106), unsaturated phosphate ester (XV, like Maxemul® 6112) or allyl nonyl phenol ethoxyated sulphate (XVI) (XVII) like respectively Hytenol® AR, BC or polyoxyalkylene alkenyl ether sulfate (XVIII) like Hytenol® KH-Reasop® SR SE and Latemul® PD, all as shown according to following formulas below:

$(C_{18}H_{36}O)\text{—}(C_2H_4O)_n\text{—}PO_3H_2$ (XIV)

$R\text{—}O\text{—}PO_3H_2$ (XV)

Where R is an alkyl group containing more than 10 atom carbon and an unsaturation

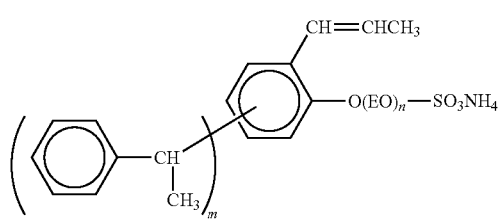
(XVI)
(XVII)

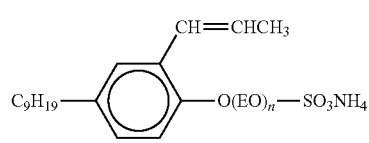
(XVIII)

for non-ionic polymerizable surfactants, like alkyl allyl ethoxylated (IXX) (Reasop® ER, Maxemul® 5011) or allylnonyl phenol ethoxylated (XX) (Reasop® NE), respectively with the structures below:

(IXX)

R: Alkyl group
X: H

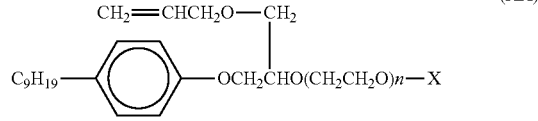
(XX)

Suitable monomers c) may be selected from:
hydroxyl alkyl $C_2$-$C_4$ (meth)acrylates, in particular hydroxy ethyl (meth)acrylate, hydroxy propyl (meth) acrylate or hydroxybutyl (meth)acrylate or allyl alcohol, preferably monomer c) being selected from hydroxyl alkyl $C_2$-$C_4$ (meth)acrylates.

According to a specific option, the said monomer e) is present and selected from: vinyl acetate, vinyl versatate and di or mono-alkyl maleates, fumarates or styrene.

According to another option, said monomer f) is present and selected from: acetoacetoxy (meth) acrylate, diacetone acrylamide, alkoxy silane monomers like vinyl triethoxy ethyl silane or gamma-methacryloxypropyl trimethoxysilane, ureido group containing monomers like N-(2-methacryloyloxyethyl)-ethylene urea.

According to another option, said multifunctional monomer g) is present and selected from ethylene glycol di (meth)acrylate, trimethylol propane tri (meth) acrylate or divinyl benzenes.

Suitable monomers a) may be selected from: methyl (meth)acrylate, ethyl (meth)acrylate, propyl (meth)acrylate, n-butyl (meth)acrylate, 2-ethyl hexyl (meth)acrylate, 2-octyl (meth)acrylate, isooctyl (meth)acrylate, nonyl(meth)acrylate or decyl (meth)acrylate, dodecyl (meth)acrylate, preferably n-butyl acrylate and preferably monomer e) is selected from styrene and monomer f) is selected from acrylonitrile.

More particularly, said aqueous polymer dispersion as defined according to the present invention is stable at least 12 h, when diluted with high amount of organic solvents, meaning dilution with higher than 30% w/w of organic solvent, with respect to the total weight of said aqueous polymer dispersion (including the said solvent). Even more particularly, it is stable for at least 12 h at strong acidic pH, meaning pH<2.0, in particular when diluted with an organic solvent at higher amount than 30% w/w with respect to said aqueous polymer dispersion.

Said initiator b2) is preferably selected from ammonium persulphate, sodium persulphate or potassium persulphate.

The aqueous polymer dispersion of the invention preferably has polymeric particles with an average particle size measured by dynamic light scattering from 20 to 3000 nm, preferably from 20 to 500 nm, with a particle size distribution which is monomodal or polymodal, more preferably being monomodal with an average particle size from 20 to 500 nm.

The aqueous polymer dispersion of the present invention is prepared by a current emulsion polymerisation method.

The aqueous dispersions of the present invention are prepared by a standard emulsion polymerization process with continuous addition of the pre-emulsified monomeric composition, to an aqueous solution of an emulsion initiator system, such as based on ammonium, sodium or potassium persulfate initiator. Red/ox (redox) initiator systems can also be used for low polymerization temperatures, for example using ammonium or sodium persulfate combined with metabisulfite as reducer.

Said process may comprise a seed polymerization with a part of the pre-emulsion of the monomers ranging from 1 to 10% or without seed polymerization.

The polymerization process may be a multistage emulsion polymerization process with at least two steps of polymerization of successively two different monomeric compositions.

For this purpose (emulsion polymerization), a conventional surfactant or a combination of surfactants may be used as a stabilizer in said emulsion polymerization of the invention. Generally, the surfactant is at least one selected from the group consisting of anionic surfactants and/or non-ionic surfactants. Examples of preferred surfactants include, but are not limited to, alkali or ammonium salts of alkyl sulfate, alkyl aryl sulphate, alkyl ether sulphate, alkylsulfonic acid, fatty acid which may be an ethoxylated fatty acid, $C_{10}$-$C_{18}$ ethoxylated alcohol, sulfosuccinates and derivatives or any combination thereof. A list of suitable surfactants is available in the book "Surfactants and Polymers in Aqueous solutions" (Holmberg et al., 2002, John Wiley & Sons).

More specifically, polymerizable surfactants can be used for producing the aqueous polymer dispersion of the present invention, which may contain anionic or non-ionic polymerizable surfactants, like Maxemul® range (Croda) or ADEKA Reasop® range or Latemul® PD range (KAO Chemicals), Noigen® and Hitenol® (Dai-Ichi Kogyo), in an amount comprised between 0.1 to 5% as presented above. Initiators can be selected preferably from ammonium persulphate, sodium persulphate or potassium persulphate as defined above in b2). The solids content (polymer w/w % vs aqueous polymer dispersion) may vary from 30 to 65%, preferably from 40 to 60%.

The second subject-matter of the present invention relates to a binder composition, which is a two component composition, comprising at least one aqueous polymer dispersion as defined above according to the invention and the said two component composition further comprising a crosslinking agent. Said cross linking agent is reacting with the hydroxyl groups brought by comonomer c) and preferably said cross linking agent is selected from: aminoplast resins from phenolic resins, urea-formaldehyde resins, melamine-formaldehyde resins or polyisocyanates, the most preferred being phenolic resins.

According to another option, said cross linking agent is reacting with the carboxyl group brought by comonomer d) and in particular said cross linking agent is selected from polyaziridines or polycarbodiimides with "poly-" meaning multifunctional aziridine- or carbodiimide-bearing compound.

According to another option, said crosslinkable two components binder composition is suitable for textiles or for non-woven treatment.

Another subject-matter of the invention relates to the use of said binder composition by applying it on a substrate selected from: cellulose fibres, glass fibres, composites, textile fibres, woven and non-woven fabrics, paper, cardboard, wood including plywood and particleboard, metals in particular aluminium, glass, plastics including plastic films.

Another and final subject matter of the invention relates to the use of said aqueous polymer dispersion according to the invention in a two components crosslinkable binder composition.

A more specific use of said aqueous dispersion relates to textile or non-woven treatment.

As a particularly stable aqueous polymer dispersion in organic solvent (with respect to the addition of organic solvent), for the present invention is an aqueous polymer dispersion that after 12 h from the dilution with more than 30% of organic solvent, it is not possible to recognize coagulate polymer in the bottom of the bottle where the mixture has been prepared or particles floating in the mixture.

As a particularly stable aqueous polymer dispersion according to the present invention, at low acidic pH is an aqueous polymer dispersion which after 12 h from the acidification of the mixture at pH<2.0, with strong acids, it is not possible to recognize coagulate polymer in the bottom of the bottle where the mixture has been prepared or particles floating in the mixture. This could be alone or combined with organic solvents.

The aqueous polymer dispersion of the present invention could be used as the single binder in a composition or combined with other binders. This composition could be a mono-component composition, meaning that it is not necessary to add any cross-linker agent before its use or a two-component composition meaning a crosslinking agent should be added before the use of the composition. This cross-linker could also be intended a reactive co-binder.

In this last case, the cross linking agents could be able to react with the hydroxyl groups brought by co-monomer c). Suitable crosslinking agents can be aminoplast resins, (phenolic, urea-formaldehyde, melamine-formaldehyde resins) or polyisocyanates, in particular the most preferred are phenolic resins.

Otherwise, the cross linking agents can react with the carboxyl group brought by comonomer d) and suitable crosslinking agents in this case can be polyaziridines or polycarbodiimides These crosslinkable compositions can be used for textiles or non-woven cellulose fibres, glass fibres, composite, textile fibres, woven and non-woven fabrics, paper, cardboard, wood including plywood and particleboard, metals, glass, plastics including plastic films.

The following examples are given only for illustrating the present invention and its performances and consequently, they do not limit the covering and scope of the present invention.

The following examples are presented for illustrating the invention and its performances and consequently the covering of the invention is not limited to these examples.

EXPERIMENTAL PART

TABLE 1

Table of raw materials used

| Commercial reference | Chemical description | Component type vs invention | Technical function | Supplier |
|---|---|---|---|---|
| Disponil ® FES32 | Fatty alcohol ethoxylated sulphate sodium salt | — | Surfactant | BASF |
| Disponil ® A1065 | Fatty alcohol ethoxylated | — | Surfactant | BASF |
| Methacrylic acid | Acrylic acid | d | monomer | EVONIK |
| Hydroxy ethyl methacrylate | Hydroxy ethyl methacrylate | c | monomer | EVONIK |
| Butyl acrylate | Butyl acrylate | a | monomer | ARKEMA |
| Styrene | Styrene | e | monomer | VERSALIS |
| Deionized water | water | — | solvent | ARKEMA |
| Sodium Persulphate | Sodium Persulphate | b2 | initiator | PEROXITALIA |

TABLE 1-continued

Table of raw materials used

| Commercial reference | Chemical description | Component type vs invention | Technical function | Supplier |
|---|---|---|---|---|
| tert-butylhydroperoxide | tert-butylhydroperoxide | — | initiator | ARKEMA |
| Bruggolite® FF6 | Derivative of sulfinic acid | — | activator | Bruegmann |
| NaAMPS 2405 | 2-acrylamido 2 methyl propane sulfonic acid sodium salt (50% solution) | b1 | monomer | Lubrizol |
| Ammonia | Ammonia | — | Neutralizing agent | |

Preparation of Aqueous Polymer Dispersions

Example 1 (Comparative)

Production of an aqueous polymer dispersion, with:

1480 g of deionized water and 12 g of Disponil® FES32 are added to a glass reactor fitted with a condenser, a stirrer, a temperature control system and inlets for nitrogen, the initiator solutions and the pre-emulsion feed, respectively. A monomer pre-emulsion composed of 1087 g of deionized water, 141 g of Disponil® FES32 and 48 g of Disponil® A1065, 1658 g of butyl acrylate, 2028 g of styrene, 79 g of methacrylic acid and 231 g of hydroxy ethyl methacrylate is prepared in another container fitted with a stirrer (pre-emulsifier).

When the contents of the reactor have reached a temperature of 80° C., 286 g of the monomer pre-emulsion and 16 g of 10% sodium persulphate aqueous solution are added into the reactor. About one minute after the addition of initiator, the remaining portion of the monomer pre-emulsion and 300 g of 5% sodium persulphate aqueous solution, over a period of 2 hours, taking care to keep the contents of the reactor at a temperature of 80° C. throughout the introduction. Then, the reaction medium is maintained at 80° C. for a further 45 minutes then cooled to 70° C. and 53 g of 13% tert-butylhydroperoxide and 143 g of a 6% Bruggolite® FF6 solution are fed separately into the reactor at 60° C. over a period of 90 minutes at constant rate.

Half an hour after the end of the above addition, the product obtained is cooled to 35° C. At the end, the mixture is filtered through a screen of 36 mesh.

The pH and solids content are adjusted respectively with ammonia to be between 5.0 and 6.0 and demi water to about 50%.

The dispersion obtained has a pH of 5.6, a viscosity (Brookfield RVT at 20 rpm and at 23° C.) of 300 mPa·s, a dry residue (solids content) of 49.9% by weight (1 h at 105° C.) and a pre-coagulate content on a screen of 275 mesh of about 170 ppm and particle size of 130 nm.

This dispersion is comparative because its amount of sulfo groups coming from the initiator is of 0.03 meq/g (lower than 0.05 meq/g which is the minimal required for the dispersion of the invention) the hydroxyl group amount being of 0.42 meq/g calculated vs the total weight of monomers (corresponding to the total weight of polymer).

Example 2

We proceed as in the above-disclosed example 1, with the same reactants amounts and global duration of the monomer pre-emulsion feeding at a constant rate over, but the amount of solution 5% strength of sodium persulphate, fed together with the pre-emulsion is increased to 895 g.

The pH and solids content are adjusted respectively with ammonia to be between 5.0 and 6.0 and demi water to about 50%. The dispersion obtained has a pH of 5.8, a viscosity (Brookfield RVT at 20 rpm and at 23° C.) of 160 mPa·s, a dry residue (solids content) of 50.7% by weight (1 h at 105° C.), and a pre-coagulate content on a screen of 275 mesh of about 80 ppm and particle size of 125 nm. Sulfo group amount: 0.102 meq/g and OH: 0.42 meq/g.

Example 3 (Comparative)

Production of an aqueous polymer dispersion, with:

1480 g of deionized water and 12 g of Disponil® FES32 are added to a glass reactor fitted with a condenser, a stirrer, a temperature control system and inlets for nitrogen, the initiator solutions and the pre-emulsion feed, respectively. A monomer pre-emulsion composed of 1087 g of deionized water, 141 g of Disponil® FES32 and 48 g of Disponil® A1065, 1658 g of butyl acrylate, 2028 g of styrene, 79 g of methacrylic acid and 231 g of hydroxyl ethyl methacrylate is prepared in another container fitted with a stirrer (pre-emulsifier).

When the contents of the reactor have reached a temperature of 50° C., 286 g of the monomer pre-emulsion and then 4.8 g of 13% tert-butylhydroperoxide solution, 60 mg of ferrous sulphate dissolved in 2 g of deionized water and 10.5 g of 6% Bruggolite® FF6 solution are added into the reactor. About one minute after the addition of initiator, the remaining portion of the monomer pre-emulsion and 89 g of tert-butylhydroperoxide and 192 g of a 6% solution of Bruggolite® FF6 in deionized water are fed into the reactor at a constant feed rate, over a period of 2 hours, taking care to keep the contents of the reactor at a temperature of 65° C. throughout the introduction. Then, the reaction medium is maintained at 65° C. for a further 45 minutes then cooled to 70° C. and 53 g of 13% tert-butylhydroperoxide and 143 g of a 6% Bruggolite® FF6 solution are fed separately into the reactor at 60° C. over a period of 90 minutes at constant rate.

Half an hour after the end of the above addition, the product obtained is cooled to 35° C. At the end, the mixture is filtered through a screen of 36 mesh.

The solids content is adjusted with demineralised water to about 50%. The dispersion obtained has a pH of 5.9, a viscosity (Brookfield RVT at 20 rpm and at 23° C.) of 1085 mPa·s, a dry residue (solids content) of 49.7% by weight (1 h at 105° C.) and a pre-coagulate content on a screen of 275 mesh of about 110 ppm and particle size of 110 nm.

Sulfo groups=0 meq/g and OH=0.42 meq/g.

Example 4 (Invention, with Sulfonate-Functional Monomers)

We proceed as in the previous disclosed example 1, with the same reactants, but we added in the pre-emulsion, after having transferred the amounts for the polymerization start, 130 g more of NaAMPS 2405.

After the final treatment, the product is cooled, then the mixture is filtered through a screen of 36 mesh. The pH and solids content are adjusted respectively with ammonia to be between 5.0 and 6.0 and demineralised water to about 50%. The dispersion obtained has a pH of 5.4, a viscosity (Brookfield RVT at 20 rpm and at 23° C.) of 2200 mPa·s, a dry residue (solids content) of 50.3% by weight (1 h at 105° C.) and a pre-coagulate content on a screen of 275 mesh of about 151 ppm and particle size of 126 nm. Sulfo groups=0.104 meq/g and OH groups=0.41 meq/g.

The summary of the monomeric and initiator composition of the polymer dispersions of the examples 1 to 4 and their characteristics are respectively reported in table 2 and in table 3:

TABLE 2 monomeric composition and initiators used during the feed, for examples 1 to 4 (% on total monomers)

|  | Example 1 | Example 2 | Example 3 | Example 4 |
|---|---|---|---|---|
| Butyl Acrylate | 42 | 42 | 42 | 42 |
| Styrene | 51 | 51 | 51 | 51 |
| Hydroxyethyl methacrylate | 5.5 | 5.5 | 5.5 | 5.5 |
| Methacrylic acid | 1.5 | 1.5 | 1.5 | 1.5 |
| 2 Acrylamido 2 Methyl Propane Sulfonic Acid Sodium salt | 0 | 0 | 0 | 1.65 |
| Sodium persulphate | 0.4 | 1.2 | 0 | 0.4 |
| Terbutyl hydroperoxide* | 0 | 0 | 0.30 | 0 |
| Bruggolite ® FF6* | 0 | 0 | 0.31 | 0 |
| sulfo groups (meq/gr) | 0.034 | 0.102 | 0 | 0.104 |
| hydroxy groups (meq/gr) | 0.42 | 0.42 | 0.42 | 0.41 |

*Not considered the amount used to decrease residual monomer content after polymerization

TABLE 3 characteristics of the polymer dispersions of the examples 1 to 4

|  | Example 1 | Example 2 | Example 3 | Example 4 |
|---|---|---|---|---|
| Solids (%) | 49.9 | 50.7 | 49.7 | 50.3 |
| pH | 5.6 | 5.8 | 5.9 | 5.4 |
| Viscosity (mPa, s, 20 rpm) | 300 | 160 | 1085 | 2200 |
| Dry coagulum | 170 | 80 | 110 | 151 |
| Particle size (nm) | 130 | 125 | 110 | 126 |

Zeta Potential

The zeta potential is an indicator of the stability of colloidal dispersions, its magnitude indicates the degree of electrostatic repulsion between adjacent, similarly charged particles in a dispersion. When the potential is small, attractive forces may exceed this repulsion and the dispersion may break and flocculate. Therefore, colloids with high zeta potential (negative or positive) are electrically stabilized while colloids with low zeta potentials tend to coagulate. By using a Malvern Nanosizer ZS90, we carried out measurements of the Z potential of the polymer dispersion of the present invention at different pH in order to try to measure its stability in harsh conditions, meaning very low pH (<2.0).

The Z potential of the aqueous polymer dispersion of the examples of the present invention measured at different pH are showed in the following figure. By using it, it is possible to recognise that examples 2 and 4, which show the best stability in methanol and acid conditions, also exhibit lower Z potential at pH<2.0 than comparative examples 1 and 3, which is a clear sign of higher stability at this lower pH.

Stability Test in Methanol

In a closed glass bottle, with a magnetic stirrer, 950 gr of methanol are added slowly under stirring to 100 g of polymer dispersion with 50% solids, when the addition is ended the mixture is stirred for further 60'.

Then, the product is considered stable, if after 12 h it is not possible to recognize visually, any coagulate polymer in the bottom or any particles floating in the mixture.

Stability Test in Methanol and Acid

After having prepared the mixture as disclosed above in the stability test in methanol, are added slowly in said mixture and under stirring, some drops of 98% sulphuric acid in order to reach a pH of the mixture <2.0, measured by indicator paper and when the addition is ended, the mixture is stirred for further 60 minutes. Then, the product is considered stable, if after 12 h, it is not possible to recognize visually, any coagulate polymer in the bottom or any particles floating in the said mixture.

The results of the stability test are showed in the following table 4.

TABLE 4 stability test results (in hours) in methanol alone and with acidic pH of the polymer dispersions of the examples 1 to 4

|  | Example 1 | Example 2 | Example 3 | Example 4 |
|---|---|---|---|---|
| Stability test in methanol (h) | 5 | >12 | 6 | >12 |
| Stability test in methanol and acid (h) | 2 | >12 | 3 | >12 |

The invention claimed is:

1. An aqueous polymer dispersion, wherein said polymer comprises units and/or groups issued from:
   a) at least one (meth)acrylic monomer which is a (meth)acrylic ester of a $C_1$-$C_{12}$ alcohol which alcohol is linear ($C_1$-$C_{12}$) or branched ($C_4$-$C_{12}$), without any other functional group than (meth)acrylate, wherein monomer a) is selected from the group consisting of: methyl (meth)acrylate, ethyl (meth)acrylate, propyl (meth)acrylate, n-butyl (meth)acrylate, 2-ethyl hexyl (meth)acrylate, 2-octyl (meth)acrylate, isooctyl (meth)acrylate, nonyl (meth)acrylate, decyl (meth)acrylate and dodecyl (meth)acrylate,
   b) at least one from monomer b1) or initiator b2) or both b1) and b2) as defined below:
      b1) at least one vinylic, allylic or (meth)acrylic monomer, bearing an anionic group derived from strong acids with pKa<3,
      b2) at least one initiator, bearing the same anionic group as b1),
      wherein said anionic groups as defined in b) are half-ester groups of sulphuric acid and their corresponding salts as presented in the following formula (II) and R is the polymeric residue:

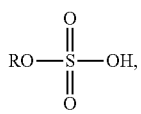

and
wherein the anionic groups as defined in b) are in an amount of at least 0.07 meq/g to 0.30 meq/g (as calculated) with respect to said polymer, c) at least one hydroxy-functional vinylic, allylic or (meth)acrylic monomer, wherein monomer c) is selected from the group consisting of hydroxyl alkyl $C_2$-$C_4$ (meth)acrylates, hydroxyl ethyl (meth)acrylate, hydroxy propyl (meth)acrylate, hydroxybutyl (meth)acrylate, and allyl alcohol, wherein hydroxy groups of monomer c) are in an amount of at least 0.1 meq/g (as calculated) with respect to said polymer, d) optionally, at least one carboxy-functional ethylenically unsaturated monomer, e) optionally, at least one vinylic monomer bearing only one vinyl group, without any other functional group than vinylic group, f) optionally, at least one vinylic or (meth)acrylic monomer bearing at least one functional group selected from: nitrile, amide, acetoacetoxy, diacetone, free silane, alkoxy-blocked silane, epoxy, urea, and ureido, and g) optionally, at least one multifunctional vinylic or (meth)acrylic monomer.

2. The aqueous dispersion according to claim 1, wherein said monomer d) is present in said polymer in a weight content with respect to said polymer of 0.05% to 6%.

3. The aqueous polymer dispersion according to claim 1 wherein said anionic groups as defined in b) are issued from initiators selected from the group consisting of sodium persulphate, ammonium persulphate and potassium persulphate.

4. The aqueous polymer dispersion according to claim 1 wherein said polymer further contains h) at least one anionic and/or non-ionic polymerizable surfactant in an amount from 0.1% to 5%.

5. The aqueous polymer dispersion according to claim 1 wherein said monomer e) is present and selected from the group consisting of vinyl acetate, vinyl versatate di- or mono-alkyl maleates, di- or mono-alkyl fumarates, and styrene.

6. The aqueous polymer dispersion according to claim 1 wherein said monomer f) is present and selected from the group consisting of: acetoacetoxy (meth)acrylate, diacetone acrylamide, alkoxy silane monomers, vinyl triethoxy ethyl silane, gamma-methacryloxypropyltrimethoxysilane, ureido group containing monomers, and N-(2-methacryloyloxyethyl)-ethylene urea.

7. The aqueous polymer dispersion according to claim 1 wherein said multifunctional monomer g) is present and selected from ethylene glycol di(meth)acrylate, trimethylol propane tri(meth) acrylate and divinyl benzenes.

8. The aqueous dispersion according to claim 1 wherein monomer e) is styrene and monomer f) is acrylonitrile.

9. The aqueous dispersion according to claim 1 wherein said initiator b2) is selected from ammonium persulphate, sodium persulphate and potassium persulphate.

10. The aqueous polymer dispersion according to claim 1 having polymeric particles with an average particle size measured by dynamic light scattering from 20 to 3000 nm, and with a particle size distribution which is monomodal or polymodal.

11. A binder composition which is a two component composition, comprising at least one aqueous polymer dispersion as defined according to claim 1 and said two component composition further comprising a crosslinking agent.

12. A binder composition according to claim 11, wherein said cross linking agent reacts with the hydroxyl groups of comonomer c), said cross linking agent being selected from the group consisting of: aminoplast resins, phenolic, urea-formaldehyde, melamine-formaldehyde resins, polyisocyanates, polyaziridines and polycarbodiimides.

13. A binder composition according to claim 11 wherein said cross linking agent reacts with the carboxyl group of comonomer d) and said cross linking agent is selected from polyaziridines and polycarbodimmides.

14. A binder composition according to claim 11 which is suitable for textiles or non-woven treatment.

15. The aqueous dispersion according to claim 1, which is stable for at least 12 h, when diluted with higher than 30% w/w of organic solvents, with respect to the total weight of said aqueous polymer dispersion (including said solvent).

16. The aqueous dispersion according to claim 15, which is stable for at least 12 h at acidic pH<2.0, when diluted with an organic solvent at higher than 30% w/w.

17. The aqueous polymer dispersion according to claim 1, wherein said polymer further bears anionic groups selected from the group consisting of an anionic group derived from a sulfonic acid group (—$SO_3H$) (I), a phosphonic acid group (III), a partial ester group of phosphoric acid (IV and V) and their corresponding salts as presented in the following formulas (I) and (III) to (V) below and borne by the polymeric residue represented by R:

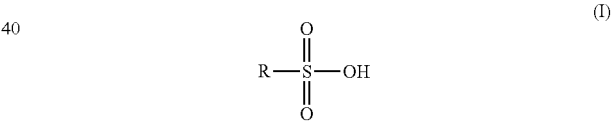

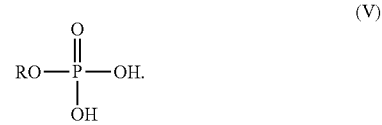

18. The aqueous polymer dispersion according to claim 17, wherein said anionic group derived from the sulfonic acid group (—$SO_3H$) (I) are issued from monomers selected from the group consisting of
2-acrylamido-2-methyl propane sulfonic acid (VI), styrene sulfonic acid (VII), 1-allyloxy-2-hydroxypropane sulfonic acids (VIII), vinyl sulfonic acid (IX), 3-sulfopropyl acrylate acid (X), and salts thereof:

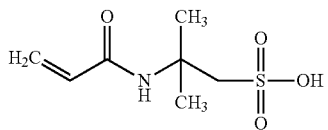 (VI)

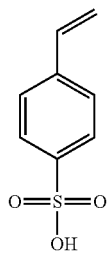 (VII)

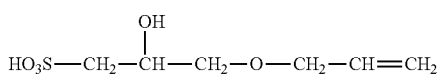 (VIII)

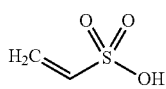 (IX)

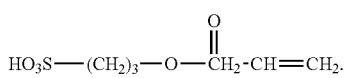 (X)

19. The aqueous polymer dispersion according to claim 1, wherein said salts of the acids are sodium or ammonium salts.

20. The aqueous polymer dispersion according to claim 17, wherein the phosphoric or phosphonic groups are issued from monomers selected from the group consisting of partial esters of phosphoric acid and derivatives and salts thereof.

21. The aqueous polymer dispersion according to claim 20, wherein said phosphoric acid and derivatives thereof are selected from the group consisting of bis(methacryloyloxy-ethyl) hydrogen phosphate (XI) or 2-(phosphonooxy)ethyl methacrylate (XII), vinyl phosphonic acid (XIII):

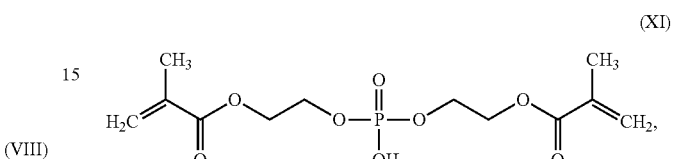 (XI)

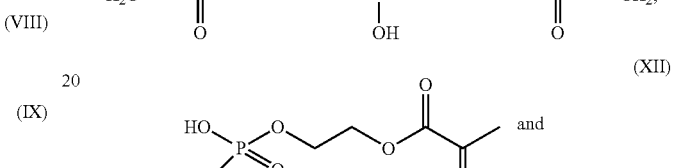 (XII)

and

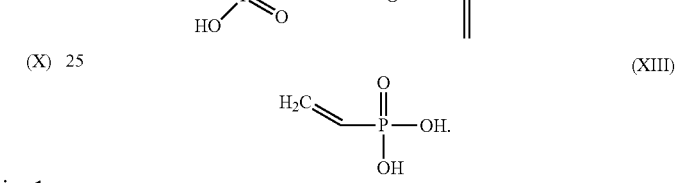 (XIII)

* * * * *